US010025042B2

(12) United States Patent
Isenhour et al.

(10) Patent No.: US 10,025,042 B2
(45) Date of Patent: Jul. 17, 2018

(54) OPTICAL CONNECTIONS HAVING INTEGRAL ALIGNMENT STRUCTURE

(71) Applicant: CORNING OPTICAL COMMUNICATIONS LLC, Hickory, NC (US)

(72) Inventors: Micah Colen Isenhour, Lincolnton, NC (US); James Phillip Luther, Hickory, NC (US); Andreas Matiss, Berlin (DE); Percil Watkins, Conover, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/864,078

(22) Filed: Sep. 24, 2015

(65) Prior Publication Data

US 2016/0011381 A1    Jan. 14, 2016

Related U.S. Application Data

(63) Continuation of application No. PCT/US2014/033155, filed on Apr. 7, 2014.
(Continued)

(51) Int. Cl.
*G02B 6/38* (2006.01)
*G02B 6/42* (2006.01)

(52) U.S. Cl.
CPC ......... *G02B 6/3886* (2013.01); *G02B 6/3849* (2013.01); *G02B 6/423* (2013.01);
(Continued)

(58) Field of Classification Search
CPC .............................. G02B 6/3886; G02B 6/423
See application file for complete search history.

(56) References Cited

U.S. PATENT DOCUMENTS 5,611,013 A * 3/1997 Curzio ................ G02B 6/4212
361/778
7,449,674 B2 * 11/2008 Ueno ..................... G02B 6/423
250/227.11
(Continued)

FOREIGN PATENT DOCUMENTS

CN       101672957           3/2010
EP         0790672 A1         8/1997  ............. H01R 13/62
(Continued)

OTHER PUBLICATIONS

Patent Cooperation Treaty International Search Report, Application No. PCT/US2014/033155, dated Jul. 10, 2015, 5 pages.
(Continued)

*Primary Examiner* — Omar R Rojas
(74) *Attorney, Agent, or Firm* — Michael E. Carroll, Jr.

(57) ABSTRACT

Disclosed are optical plugs and optical connectors having one or more integral alignment features used for making optical connections. In one embodiment, an optical connector comprising an optical body and at least one magnetic attachment. The optical body comprises a front side with a first surface, an optical section comprising at least one optical channel, and a datum section disposed on a second surface of the front side and comprising one or more integral alignment features. The optical body also comprises a circuit mounting portion disposed at a rear side of the optical body. The datum section may be arranged on opposite sides of the optical section. Further, the one or more integral alignment feature may be arranged at a top and a bottom of the datum section for alignment in a first direction. The first surface may also be recessed from the second surface.

24 Claims, 12 Drawing Sheets

Related U.S. Application Data

(60) Provisional application No. 61/811,388, filed on Apr. 12, 2013.

(52) U.S. Cl.
CPC ......... G02B 6/4281 (2013.01); G02B 6/4292 (2013.01); *G02B 6/4204* (2013.01)

(56) References Cited

U.S. PATENT DOCUMENTS

| | | | |
|---|---|---|---|
| 2010/0163754 A1 | 7/2010 | Van Herpen | 250/492.1 |
| 2012/0039562 A1* | 2/2012 | Tan | G02B 6/325 385/14 |
| 2012/0148195 A1 | 6/2012 | Umeno | 385/53 |
| 2012/0155803 A1 | 6/2012 | Benjamin et al. | 385/33 |
| 2012/0183262 A1* | 7/2012 | Schwandt | G02B 6/3817 385/88 |
| 2013/0087690 A1 | 4/2013 | Sloey et al. | 250/216 |
| 2013/0089290 A1 | 4/2013 | Sloey et al. | 385/74 |
| 2015/0219863 A1* | 8/2015 | Haase | G02B 6/3883 385/60 |

FOREIGN PATENT DOCUMENTS

| | | | | |
|---|---|---|---|---|
| JP | 63058408 A | | 3/1988 | G02B 6/42 |
| WO | WO2014168866 A1 | | 10/2014 | G02B 6/42 |

OTHER PUBLICATIONS

Written Opinion issued in corresponding PCT appln. No. PCT/US2014/033155, dated Jul. 10, 2015 (4 pages).
CN2014800230247 Search Report dated Jul. 18, 2016; 2 Pages; Chinese Patent Office.
International Search Report issued in International Patent Application No. PCT/US2014/033155, dated Jul. 10, 2014, 5 pages.

\* cited by examiner

OPTICAL CONNECTIONS HAVING INTEGRAL ALIGNMENT STRUCTURE

PRIORITY APPLICATIONS

This application is a continuation of International Application No. PCT/US14/33155, filed on Apr. 7, 2014, which claims the benefit of priority to U.S. Application No. 61/811,388, filed on Apr. 12, 2013, both applications being incorporated herein by reference.

FIELD

The disclosure is directed to optical connections for use in electronic devices. More specifically, the disclosure is directed to optical connectors such as plugs and optical connectors having one or more integral alignment structures for aligning one or more optical channels of the optical connection.

BACKGROUND

As electronic devices move toward operation at faster data rates the electrical interfaces on these devices along with the electrical transmission cables will reach their bandwidth capacity limitations. Additionally, the electronic devices are trending to smaller and thinner footprints. Optical fibers have displaced copper-based connectivity in much of the traditional long-haul and metro telecommunication networks for numerous reasons such as large bandwidth capacity, dielectric characteristics and the like. As consumers require more bandwidth for consumer electronic devices such as smart phones, laptops, tablets and the like optical fibers and optical ports for optical signal transmission are being considered for replacing the conventional copper-based connectivity for these applications. However, there are significant challenges for providing optical connectivity in consumer devices compared with copper-based connectivity. By way of example, devices such as smart phones, laptops and tablets are exposed to rough handling and harsh environments and the consumer will expect optical connectivity to handle these demanding conditions. Further, these types of devices will require a large number of mating/unmating cycles during their lifetime.

Consequently, there is an unresolved need for optical connections that may be used for relatively small devices like typical consumer applications such personnel devices such as smart phones, tablets and other consumer devices that have a relatively small footprint. The concepts disclosed herein solve this unresolved need for optical connections.

SUMMARY

The disclosure is directed to optical connections having one or more integral alignment features. In one embodiment, the disclosure is directed to an optical connector comprising an optical body and at least one magnetic attachment. The optical body has a front side with a first surface, an optical section comprising at least one optical channel, a datum section disposed on a second surface of the front side and comprising one or more integral alignment features. The optical body also comprises a circuit mounting portion disposed at a rear side of the optical body. The datum section may be arranged on opposite sides of the optical section. In further embodiments, one or more first integral alignment features are arranged at a top and a bottom of the datum section for alignment in a first direction. Still further, the first surface may be recessed from the second surface for providing a second integral alignment feature for alignment in a second direction. In other embodiments, a circuit having at least one active component is aligned with the at least one optical channel of the optical body.

Another aspect of the disclosure is directed to an optical plug comprising a plug body, a plug insert, and one or more magnetic attachments. The plug body comprises an optical section with one or more optical channels, a datum section, a plug insert cavity, and one or more ledges formed at the interface between the optical section and the datum section. The plug insert comprises one or more respective bores for receiving one or more optical fibers, wherein the plug insert has a shape for being received in the plug insert cavity. In one embodiment, the datum section is arranged on opposite sides of the optical section. In other embodiments, the plug body may further include one or more lenses. In still further embodiments, the plug body further includes one or more integral alignment features being one or more first integral alignment features arranged at an upper portion and a lower portion of the plug body for alignment in a first direction.

The disclosure is also directed to a method for making an optical connector. The method comprises providing an optical body comprising a front side with an optical section at a first surface comprising at least one optical channel, a datum section disposed on a second surface of the front side and having one or more integral alignment features, and attaching a circuit to a circuit mounting portion so that an active component is aligned with the at least one optical channel.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference will now be made in detail to the embodiments of the disclosure, examples of which are illustrated in the accompanying drawings. Whenever possible, like reference numbers will be used to refer to like components or parts.

The optical connections disclosed herein enable high-speed data applications for transmitting optical signals to electronic devices such as speeds of 5 GB/sec or greater along with having a relatively small and compact footprints so that they are useful for use with electronic devices such as consumer devices and the like. The concepts may be used with optical connector such as used as a port of an electronic device so it can receive optical signals for conversion into electrical signals and vice versa for transmitting signals. The concepts disclosed may also be used with complimentary optical plugs (hereinafter "plug") for cable assemblies and such for mating with the optical connector. Further, the concepts of the optical connections may be used in other application such as optical backplanes, switches, routers and other equipment. In order to transmit/receive optical signals, the optical connector or plug may include one or more optical channels for that may include one or more lenses or not as desired. By way of example, the one or more lenses of the optical connector are used for collimating or focusing the light from the transmission channel that is optically coupled to a laser such as a vertical-cavity surface-emitting laser (VCSEL) to an optical fiber in a complementary plug of a cable assembly, and from the optical fiber in the complementary plug to a receive channel of the optical connector that is optically coupled to an active element such as a photodiode or the like. The optical connector, plug or other optical connections using the concepts disclosed may provide plug and play connectivity with a footprint that is advantageous for use with electronic devices having thin and compact profiles if desired. Further, the concepts allow simple plug and optical connector designs with fewer parts than conventional optical connectors, inhibit damage to the optical connection from sudden or unexpected unmating and allow access to mating interfaces for cleaning and the like for applications that are expected to experience large number of mating/unmating cycles such as consumer electronic applications.

Figure 1:
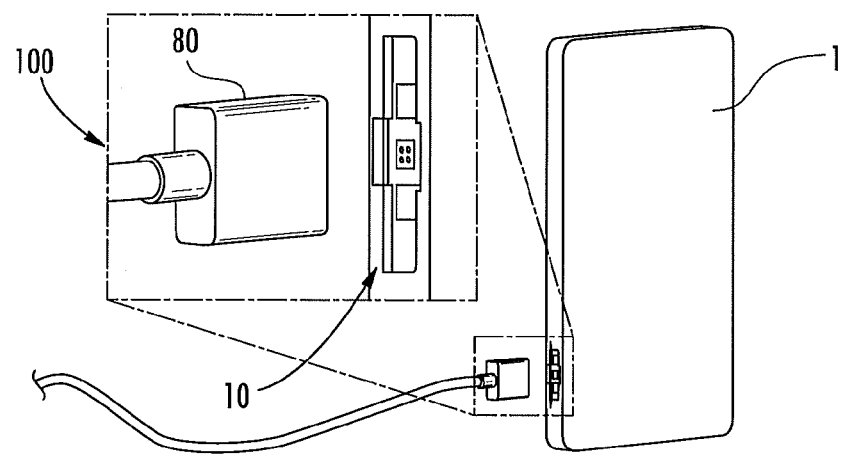
FIGS. 1 and 2 are perspective views of an electronic device having an explanatory optical connector and a complimentary optical plug as a portion of a cable assembly according the concepts disclosed herein.
Figure 2:
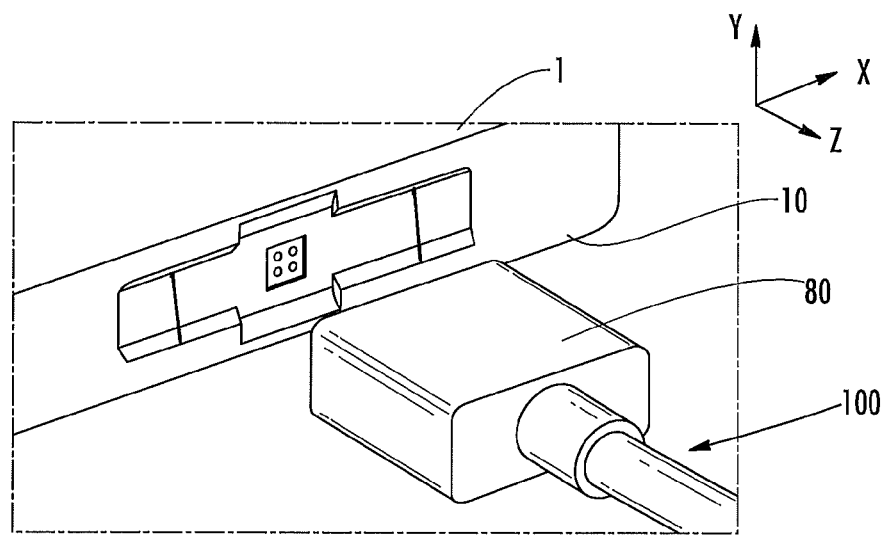
Figure 3:
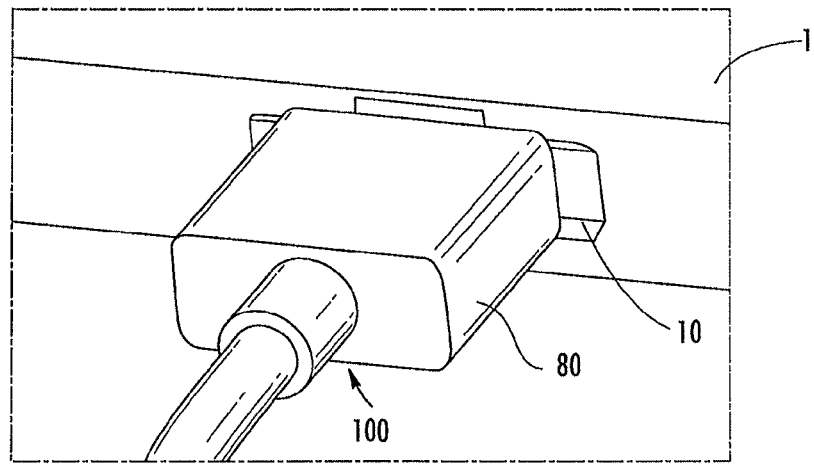
FIG. 3 is a perspective view of the optical connector and optical plug of FIGS. 1 and 2 mated together.
Figure 9:
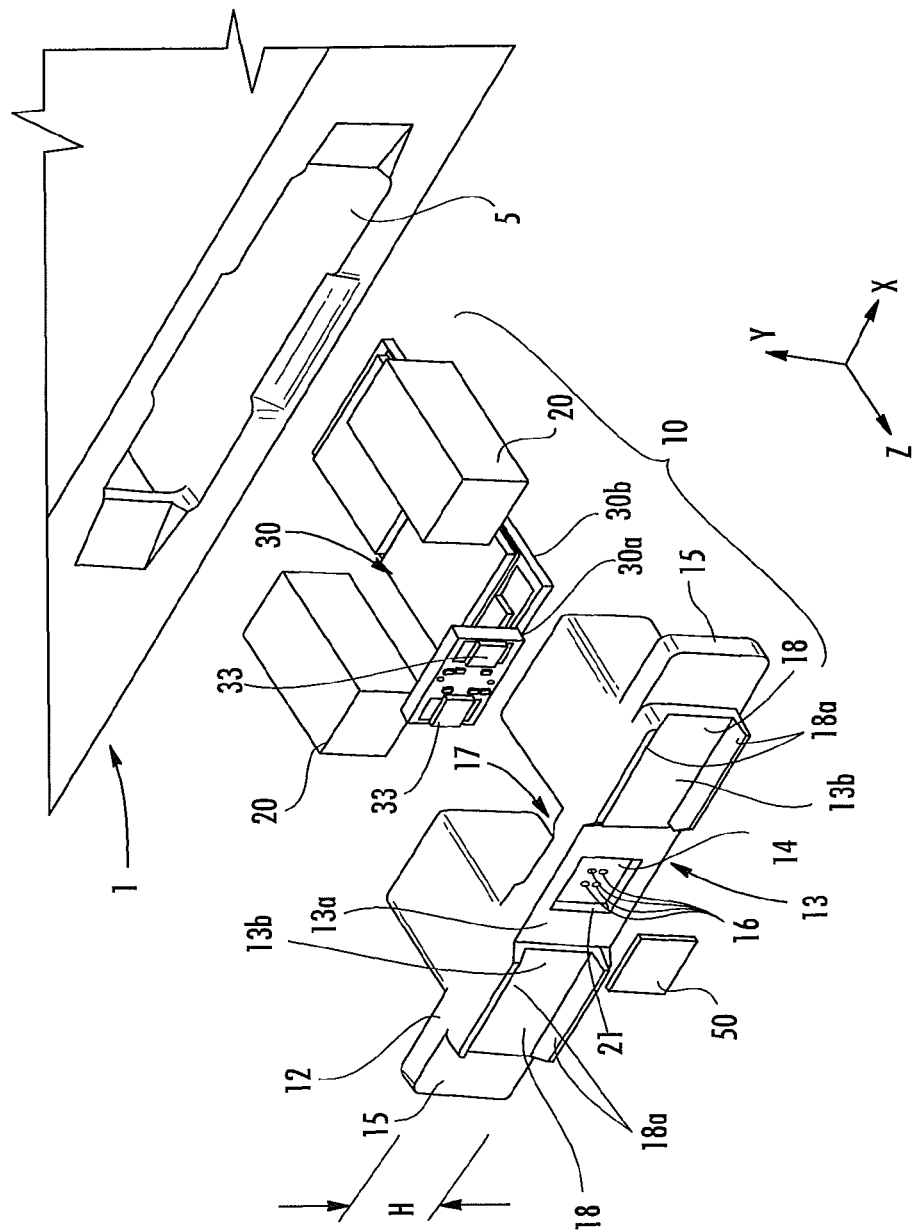
FIG. 9 is a partially exploded view of the optical connector removed from a port of the electronic device.

FIGS. 1 and 2 are perspective views of an explanatory optical connection for an electronic device 1 in an unmated state and FIG. 3 depicts the optical connection in a mated state. Although, the figures show the optical connection between an optical connector of an electronic device and a plug of a cable assembly the optical connection may be used for other applications as desired. Specifically, electronic device 1 includes a port 5 (FIG. 9) having an explanatory optical connector 10 for mating with a complimentary plug 80 that is a portion of a cable assembly 100 for making a connection with the device 1 according the concepts disclosed herein. Although, the embodiment shown makes an optical connection, the concepts disclosed may be used for making optical and electrical connections. As best shown in FIG. 9, optical connector 10 includes an optical body 12 and at least one magnetic attachment 20 and will be described in more detail below. As used herein, "magnetic attachment" means either a magnet or a ferrous material that is attracted to a magnet. Thus, optical connectors and optical plugs may have magnetic attachments that are respective magnets that attract each other or a magnet and ferrous material that are attracted together. In further embodiments, the optical connector 10 may further include a circuit 30 for converting the optical signals to electrical signals and vice versa. Optical connector 10 may also include an optional cover 50 for protecting one or more optical channels of the optical body 12 from dirt, debris and the like.

Figure 4:
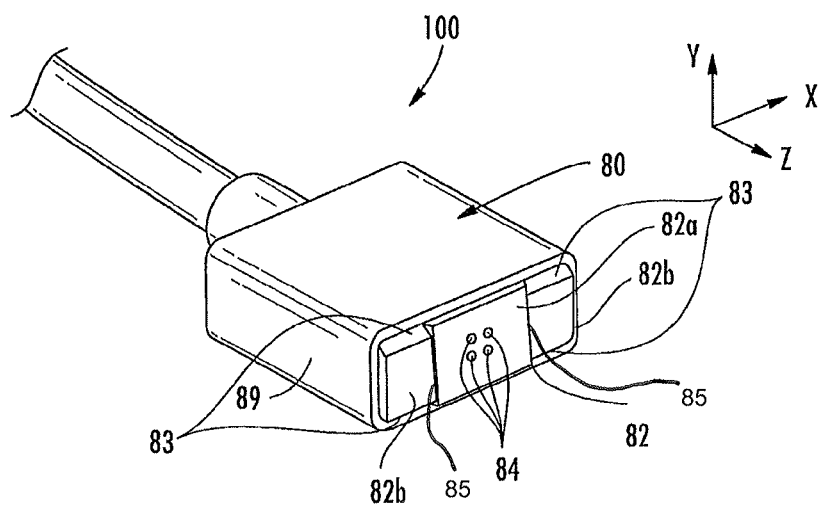
FIG. 4 is a front perspective view of the optical plug of FIGS. 1-3.
Figure 5:
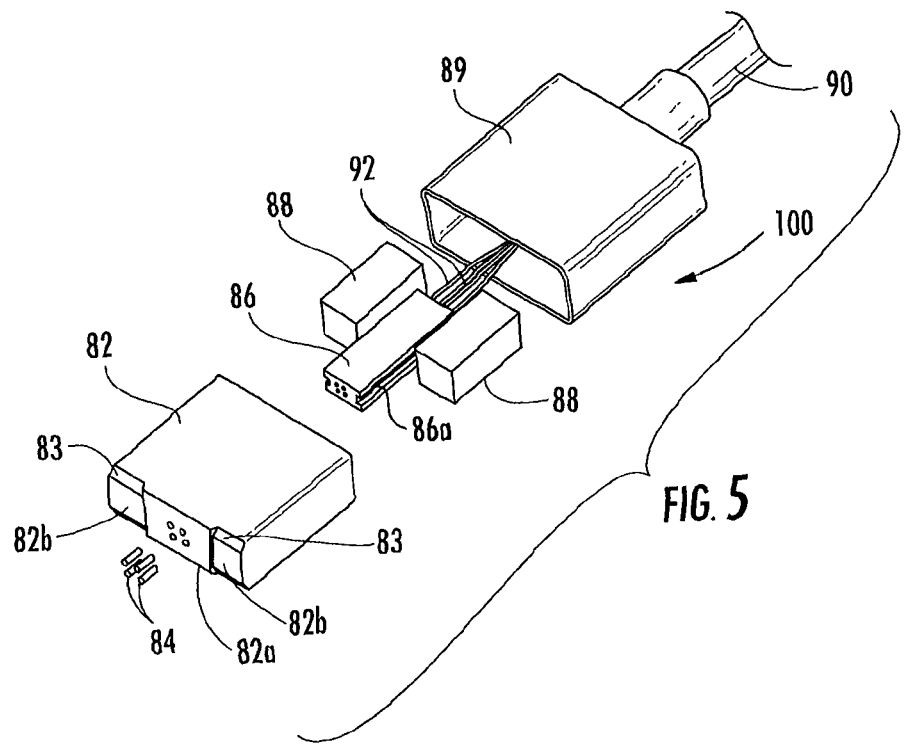
FIG. 5 is a partially exploded view of the optical plug of FIGS. 1-3.

FIG. 4 is a front perspective view of the plug 80 of cable assembly 100 and FIG. 5 is a partially exploded view of the plug 80. As best depicted in FIG. 5, plug 80 includes a plug body 82, one or more lenses 84, a plug insert 86, one or more magnets 88, and a housing 89. In this embodiment, lenses 84 are discrete elements such as gradient index (GRIN) lens that fit into bores (not numbered) that extend to the front surface of plug body 82 and have a spacing for mating with the complimentary optical channels of optical connector 10. In other embodiments, the one or more lenses 84 may be integrally formed with the plug body 82. As shown, a cable 90 having optical fibers 92 extend into the housing 89 and are inserted into and secured in one or more respective bores (not numbered) of the plug body 82. The optical fibers 92 are positioned so that they are in optical communication with the one or more lenses 84 when the plug insert 86 is attached to the plug body 82.

Specifically, the plug insert 86 has a shape for being received into a plug insert cavity 82c of the plug body 82. In this embodiment, the plug insert cavity 82c is configured as a central cavity of the plug body 82 so the plug insert 86 precisely fits into the plug body 82 and may be secured in a suitable manner such as using an adhesive and/or mechanical structure; however, the plug insert cavity 82c may have other suitable locations as desired. The plug insert 86 may have one or more orientation features 86a that cooperate with respective orientation features of the plug body 82 for aligning and orientating it within the plug body 82. Stated another way, this embodiment uses the fit of the plug insert 86 into the plug insert cavity 82c for aligning the bores of the plug insert 86 with the optical channels of the plug body 82 so that optical signals may be transmitted to lenses. For instance, the orientation features 86a of the plug insert may be one or more grooves 86a and the corresponding orientation features of the plug body 82 are tongues arranged in the plug insert cavity that cooperate with the grooves of the plug insert or vice versa. However, other orientation arrangements between the plug insert and plug body are possible such as simply using a predetermined shape for the plug insert and plug insert cavity of the plug body. By way of example, the plug insert may have a trapezoidal plug insert shape that cooperates with a corresponding trapezoidal plug insert cavity of the plug body 82. In other embodiments, the lenses of the plug may be eliminated and the plug insert 86 having the optical fibers 92 may extend to the front side plug body 82 for direct mating of the ends of the respective optical fibers 92 with a complimentary optical connector; however, the lenses may provide improved coupling with lower insertion loss for the optical connection.

In this embodiment, attaching the plug 80 to the optical connector 10 is accomplished using one or more magnets having suitable retention strength for allowing quick and easy mating/unmating while providing a generally clean look for the plug and optical connector when assembled. As shown, plug 80 includes magnets 88 disposed on the outboard sides of the plug body 82. Magnets 88 fit into magnet cavities 82d of the plug body and may be secured with an adhesive or friction fit. In other embodiments, the magnets 88 may molded into the plug body 82 if desired. When assembled, the housing 89 fits about a portion of the plug body 82 and plug may include further optional components. For example, the plug may optionally include a crimp band for strain-relieving cable 90 to the housing 89 of the plug 80 for making cable assembly 100. Other variations of the plug are also possible. By way of example, although plug 80 is shown as a linear design with the cable assembly, the concepts disclose may be arranged so that the plug has angled design with respect to the incoming cable.

With continuing reference to FIGS. 4 and 5, plug body 82 includes an optical section 82a and a datum section 82b (e.g., a first surface and a second surface). The optical section 82a includes one or more optical channels that cooperate and align with the optical channels on optical connector 10 for transmitting optical signals and the datum section 82b provides integral alignment structure for mating with the complimentary optical connector. The one or more lenses 84 are located at an optical section 82a of the plug body 82. In this embodiment, the plug 80 and complimentary optical connector 10 both include respective integral alignment features for providing mating alignment in a first direction and a second direction. As used herein, "integral alignment features" means that the features are formed as part of the plug body of the plug or the optical body of the optical connector without the use of further components such as pins, pistons or the like for alignment. Further, the datum section 82b is arranged on opposite sides of the optical section 82a for providing an integral alignment feature in a given direction as discussed below. In other words, the datum section 82b is split so a portion of the datum section is on a left-side of the optical section 82a and a portion is on the right-side of the optical section 82a. Likewise, the datum section of the corresponding optical connector is split to cooperate with the datum section 82b of the plug 80.

Specifically, plug 80 includes respective alignment features formed in the plug body 82 (i.e., integrally formed on the plug body) for providing mating alignment in a first direction and a second direction for simplicity of design and registering the alignment features with the optical channels of the plug body, but the alignment features could be located on other portions of the plug as well such as the housing, etc. The first alignment features 83 of the plug 80 are arranged at an upper portion and a lower portion of the plug body 82 for alignment in the first direction (e.g., the Y-direction) when mated. In this embodiment, alignment features 83 are configured as recesses on the datum sections 82b of plug body 82 that cooperate with respective protrusions on the complimentary optical connector 10. In this case, plug body 82 includes alignment features 83 arranged near the corners of the datum section 82b. The recesses are angled inward with a taper so that any off-axis forces applied to the plug when in the mated state inhibit damage to both the plug and optical connector during intentional or inadvertent disconnection, while still maintaining adequate alignment.

The second alignment feature of plug 80 is formed by the optical section 82a of plug body 82 extending forward of the datum section 82b, thereby creating one or more ledges 85 at the interface between the sections for creating second alignment features on the plug body 82 that cooperates with the optical connector 10 when mated for alignment in a second direction (e.g., the X-direction). Additionally, even with these alignment features on plug 80, the optical mating face of the optical section 82a is generally planar and accessible for cleaning.

Figure 6:
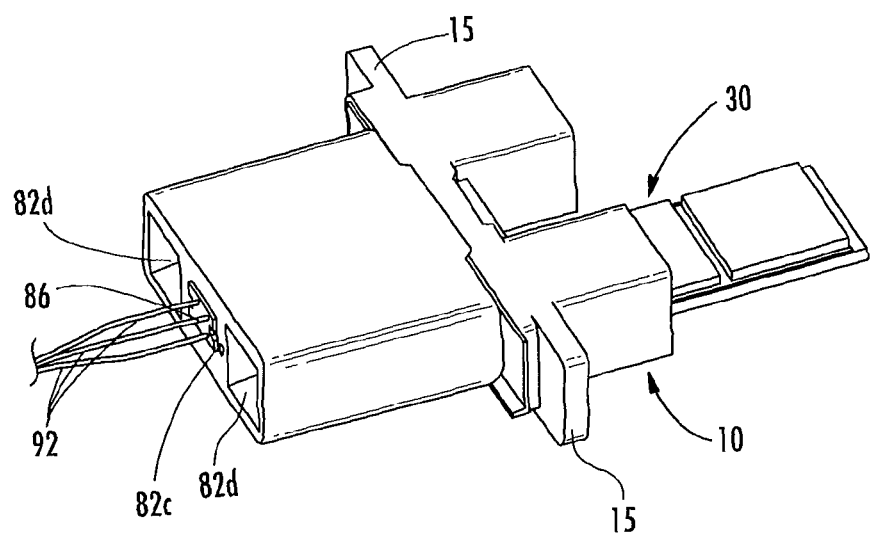
FIG. 6 is a first perspective view of the optical connector and the optical plug of FIGS. 1 and 2 mated together with the optical connector removed from the electronic device and the optical plug shown without the housing.
Figure 7:
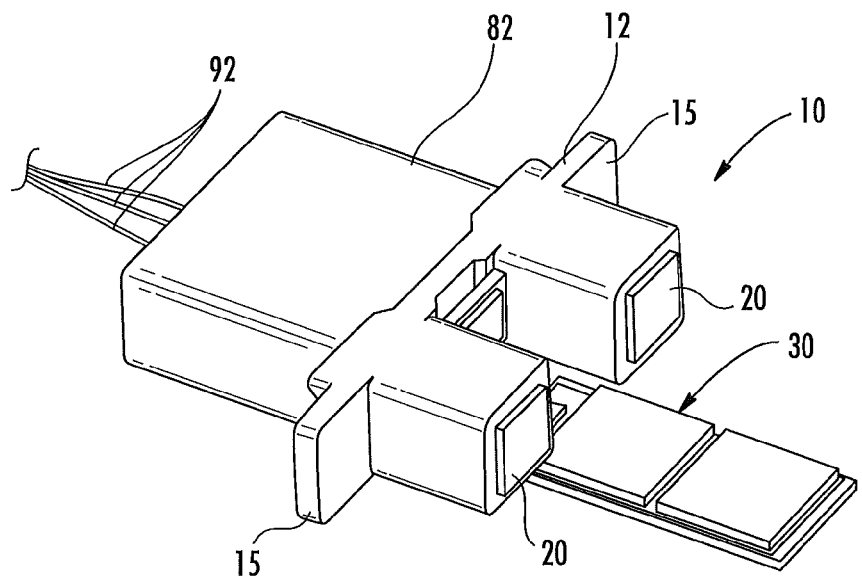
FIG. 7 is a second perspective view of the optical connector and the optical plug of FIGS. 1 and 2 mated together with the optical connector removed from the electronic device and the optical plug shown without the housing.
Figure 8:
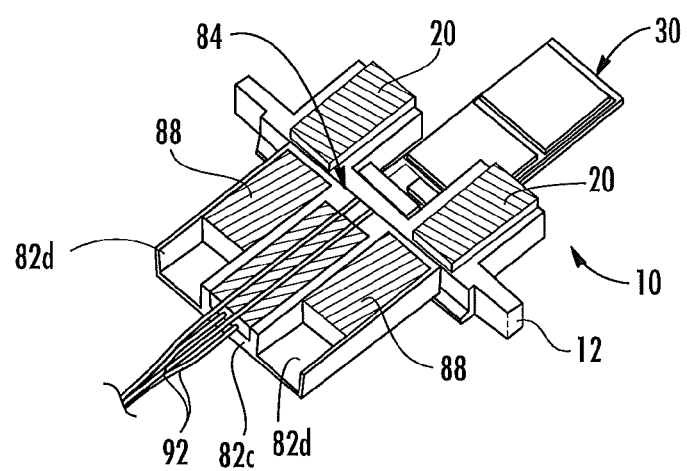
FIG. 8 is a cut-away perspective view of the optical connector and the optical plug of FIGS. 1 and 2 mated together with the optical connector removed from the electronic device and the optical plug shown without the housing.

FIGS. 6-8 are various views optical connector 10 and the plug 80 mated together with the optical connector 10 removed from the electronic device 1 and the plug 80 shown without the housing and the cable. As shown, the alignment features of plug 80 cooperate with the integral alignment features of optical connector 10 so that the respective optical channels of the plug 80 are properly aligned with the optical channels of optical connector 10 for optical communication. FIGS. 6 and 7 show the cooperation of the first alignment features 83 and the second alignment features 85 of the plug 80 with the corresponding integral alignment features of the optical connector 10 that will be discussed in more detail below. As depicted, the respective alignment features of the plug 80 and optical connector 10 provide alignment of the optical connection in two-directions (X-direction and Y-direction) and alignment in the Z-direction is controlled by the physical contact of the plug and optical connection when mated and secured using the respective magnets. Specifically, the one or more first alignment features 83 of plug 80 cooperate with one or more first alignment features arranged at a top and a bottom of the datum section of the optical connector 10 for alignment in the first direction and the second alignment features 85 of plug 80 cooperate with the second alignment features of the optical connector 10 for alignment in the second direction. FIG. 8 is a cut-away perspective view showing optical channels of the plug 80 aligned with the respective optical channels of the optical connector 10.

Next, the explanatory optical connector 10 will be described in further detail. FIG. 9 shows a partially exploded view of the optical connector removed from the port 5 of the electronic device 1. As shown, the concepts disclosed allow for a simple construction of optical connector 10 with fewer parts than a conventional optical connector since the alignment structure is integrated into the optical body 12. As shown, optical connector 10 includes optical body 12 and at least one magnet attachment 20. The optical connector 10 may further include circuit 30 for converting the optical signals received from the complimentary plug to electrical signals for the electronic device and vice versa. Optical connector 10 may also optionally include a cover 50 made from glass, plastic or a composite material for added durability by protecting the optical section from dirt, debris and the like. Cover 50 is sized to fit into a portion of the optical body 12 at the optical section and can be secured by suitable means such as adhesive or snap-fit.

Optical body 12 has a front side 13 with a first surface 13a, an optical section 14 including at least one optical channel 16, a datum section 18 disposed on a second surface 13b of the front side 13. The datum section 18 includes one or more integral alignment features 18a (e.g., first integral alignment features) formed by the optical body 12. Optical body 12 also includes a rear side 17 with a circuit mounting portion 19. Optical body 12 may also include an optional recess 21 for mounting cover 50 to the front side 13 of the optical body 12 for protecting the optical section 14.

In this embodiment, the datum section 18 is arranged on opposite sides of the optical section 14. In other words, the datum section 18 is split so that a portion of the datum section 18 is on the left-side of the optical section 14 and a portion is on the right-side of the optical section 14 of the optical body 12. Integral alignment features 18a are formed to compliment and cooperate with the first alignment features 83 of plug 80 as shown in FIGS. 6 and 7 for alignment in a first direction. Specifically, first integral alignment features 18a are arranged at a top and a bottom of the datum section 18 for alignment with the plug 80 in the first direction (Y-direction). Stated another way, first integral alignment features 18a are arranged near the corners of the datum section 18. Further, the first surface 13a is recessed from the second surface 13b for providing a second integral alignment feature for alignment in the second direction. In this embodiment, the first surface 13a is disposed at a medial portion of the optical body 12 at the front side 13 and recessed rearward relative to the second surface 13b that is disposed on opposite sides of the first surface 13a. Consequently, one or more ledges (not numbered) are formed on the optical body 12 between the interface between the first surface 13a and the second surface 13b, thereby allowing the second alignment features of plug 80 to cooperate with the second alignment features of the optical connector 10 for alignment in the second direction. Optical body 12 also includes mounting flanges 15 outboard of the datum section 18.

When mated, the one or more integral alignment features 18a of optical connector 10 so that the respective optical channels of the plug 80 are aligned with the optical channels of optical connector 10 for optical communication. Specifically, the first alignment features 83 and the second alignment features 85 of plug 80 cooperate with the first and second integral alignment features of the optical connector 10. As depicted, the respective alignment features of the plug 80 and optical connector 10 provide alignment of the optical connection in two-directions (X-direction and Y-direction) and alignment in the Z-direction is controlled by the physical contact of the plug and optical connection when mated and secured using the respective magnets or using magnets and ferrous elements on opposite sides. Specifically, the one or more first alignment features 83 of plug 80 cooperate with one or more first alignment features 18a arranged at a top and a bottom of the datum section 18 of the optical connector 10 for alignment in the first direction and the second alignment features 85 of plug 80 cooperate with the second alignment features (i.e., the one or more ledges at the interface created by the recessed first surface) of the optical connector 10 for alignment in the second direction. Consequently, the optical channels of the optical connector 10 are suitably aligned with the optical channels of the plug 80 when mated.

Circuit 30 is used for converting the optical signals to electrical signals and vice versa and may have any suitable arrangement or layout. Circuit 30 includes at least one active component 32 aligned with at least one optical channel of the optical body. Active component 32 is an electro-optical component used for transmitting or receiving optical signals to/from the optical body 12. By way of example, active component 32 is a photodiode or other similar device for receiving optical signals or a vertical-cavity surface-emitting laser (VCSEL) for transmitting optical signals. Additionally, circuit 30 may include further components for processing signals such as integrated circuits (ICs) like clock and data recovery (CDR), laser drivers, serializer/deserializer (SerDes), and the like.

Figure 10:
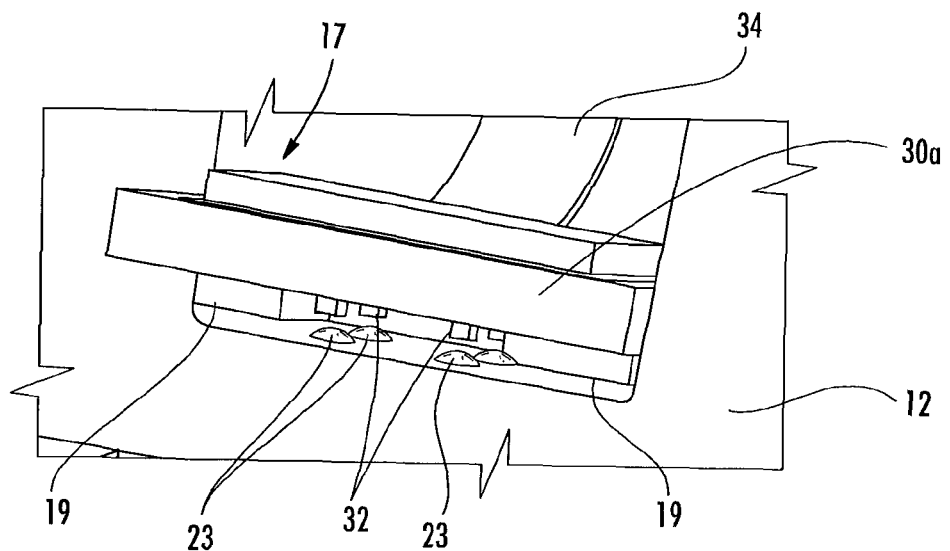
FIG. 10 is a detailed perspective view of a portion of the optical connector showing a circuit attached to the optical body of the optical connector.
Figure 11:
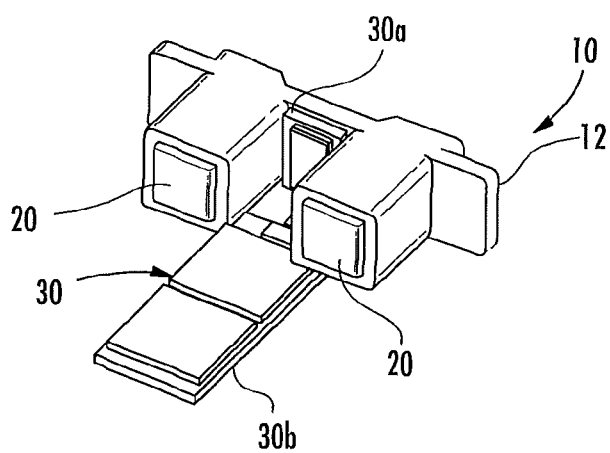
FIG. 11 is a rear perspective view of the optical connector of FIGS. 1 and 2.

FIG. 10 is a detailed perspective view of a portion of the optical connector 10 showing the circuit attached so that at least one active component 32 is aligned with the at least one optical channel 16 and operably attached to the optical body 12 of the optical connector 10. In this embodiment, the circuit such as first circuit portion 30a of circuit 30 is aligned with the at least one optical channel 16 of optical body 12 and operably attached to the circuit mounting portion 19 at the rear side 17 of the optical body 12. In this embodiment, the optical channels 16 include respective lenses 23 at the rear side 17 of the optical body 12 for focusing or collimating the optical signals to/from the active components 32. "Operably attached" means that the active components of the circuit are properly spaced from the optical channels of the optical body such as the lenses of the optical body and may include the use of spacers or the like between the optical body and the circuit for maintaining the desired distance between the active components and optical channels. FIG. 11 is a rear perspective view of the optical connector 10 showing circuit 30 operably attached to the optical body 12.

Further, circuit 30 may use a flexible substrate 34 for making an electrical connection between a first circuit portion 30a and a second circuit portion 30b. In other words, the flexible substrate 34 allows an electrical turn so that the first circuit portion 30a of the circuit having the active components (e.g., photodiodes and VCSELs), transimpedence amplifier, and the laser drivers are mounted to a portion of the optical body 12. Splitting the circuit into a first circuit portion 30a that is attached to the optical body 12 and a second circuit portion 30b for other components such as the clock and data recovery (CDR) IC and Serdes IC allow. Thus, the flexible substrate 34 provides an electrical turn with flex coupling between the circuit portions 30a and 30b, thereby allowing relatively small form-factors for the optical connector since the CDR and Serdes IC's are relatively large and are located on another circuit portion that can be orientated in different manner such as a horizontal plane where there is more space available.

Circuit 30 may also include other advantageous arrangements when having optical connectors with more than one transmit and one receive channel. For instance, the circuit 30 may use multiple TIAs and/or laser drivers 33 on the first circuit portion 30a of circuit 30. By way of example, optical connector 12 has multiple optical channels arranged in a 2×2 array. Consequently, the first circuit portion 30a with the TIAs and laser drivers can now be split (i.e., multiple TIAs and laser drivers) with a dedicated TIA and laser driver 33 placed onto each side of the plurality of optical channels that are arranged in an two-by-two array. In this embodiment, circuit 30 uses multiple TIA/laser driver arrangement 33 (i.e., one TIA/laser driver for each side of the 2×2 array; one TIA/laser driver for the left side and one TIA/laser driver for the right side) for enabling a relatively small height H for the optical connector 10, thereby allowing use of the optical connector in thin devices such as smart phones, tablets and the like. Further, placing electrical components such as the TIA and laser drivers relatively close to the active components such as photodiodes and VCSELs allows relatively short wire bond lengths such as 100 microns or shorter for supporting high-speed data transfer rates such as 20 Gb/sec and higher.

Figure 12:
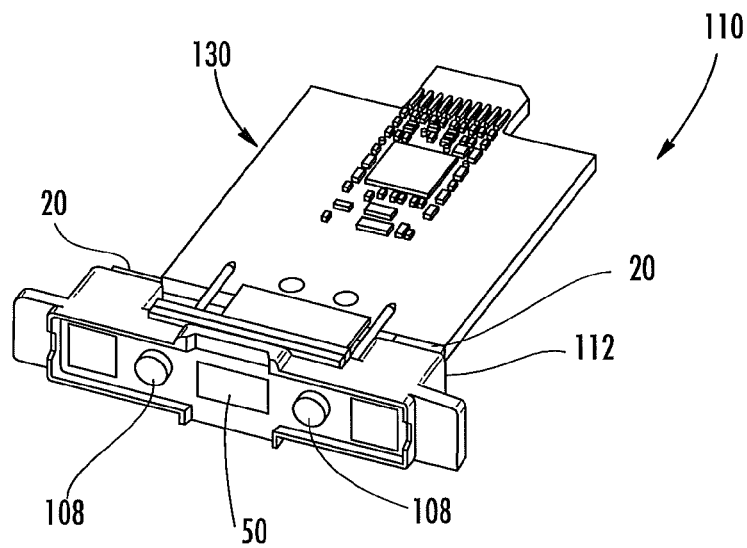
FIGS. 12 and 13 are perspective views of another explanatory optical connector according to the concepts disclosed herein further including electrical connections.
Figure 13:
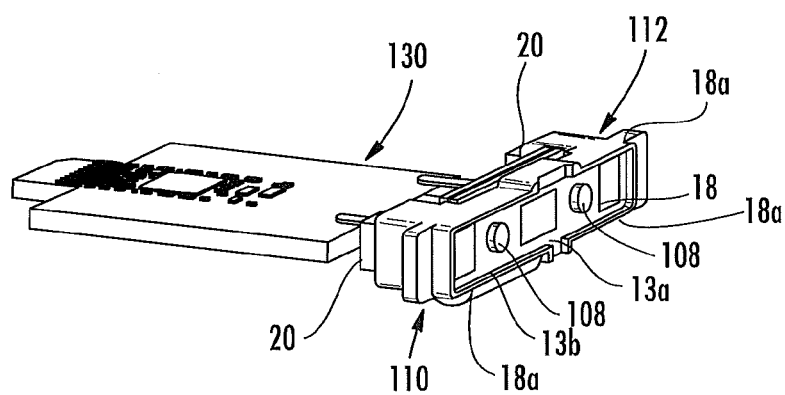

FIGS. 12-20 are views of another optical connection that includes electrical and optical connectivity according to the concepts disclosed herein. FIGS. 12 and 13 are perspective views of another explanatory optical connector 110 according to the concepts disclosed herein that further includes one or more electrical contacts 108. Optical connector 110 is similar to optical connector 10, but includes optical body 112 for supporting one or more electrical contacts 108. Optical connector 110 includes an optical body 112 and at least one magnet attachment 20. In further embodiments, the optical connector 110 may further include a circuit 130 that is similar to circuit 30, but further supports electrical connectivity for electrical contacts 108. As shown, optical body 112 has openings for receiving the electrical contacts 108. Additionally, optical connector 110 may include an optional cover 50.

Figure 14:
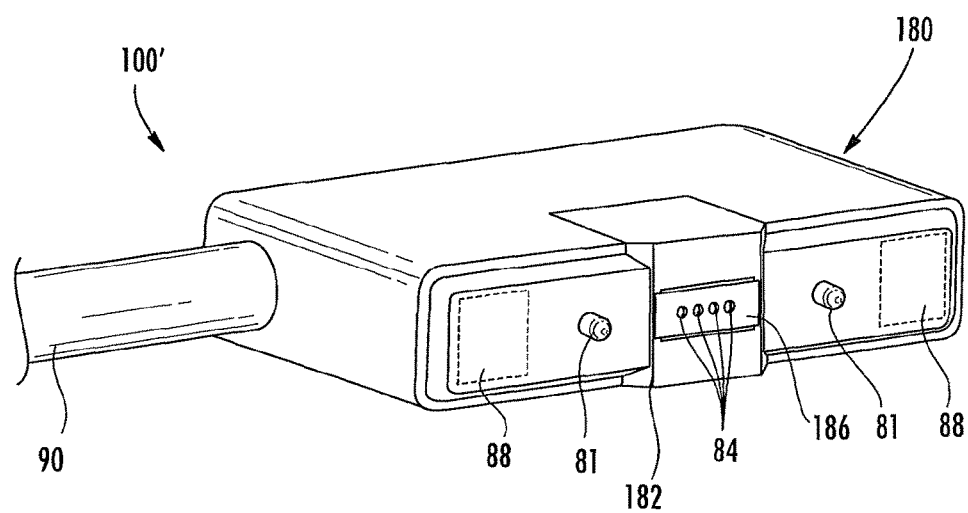
FIGS. 14 and 15 are perspective views of another complimentary explanatory optical plug shown as a portion of a cable assembly suitable for mating with the optical connector of FIGS. 12 and 13.
Figure 15:
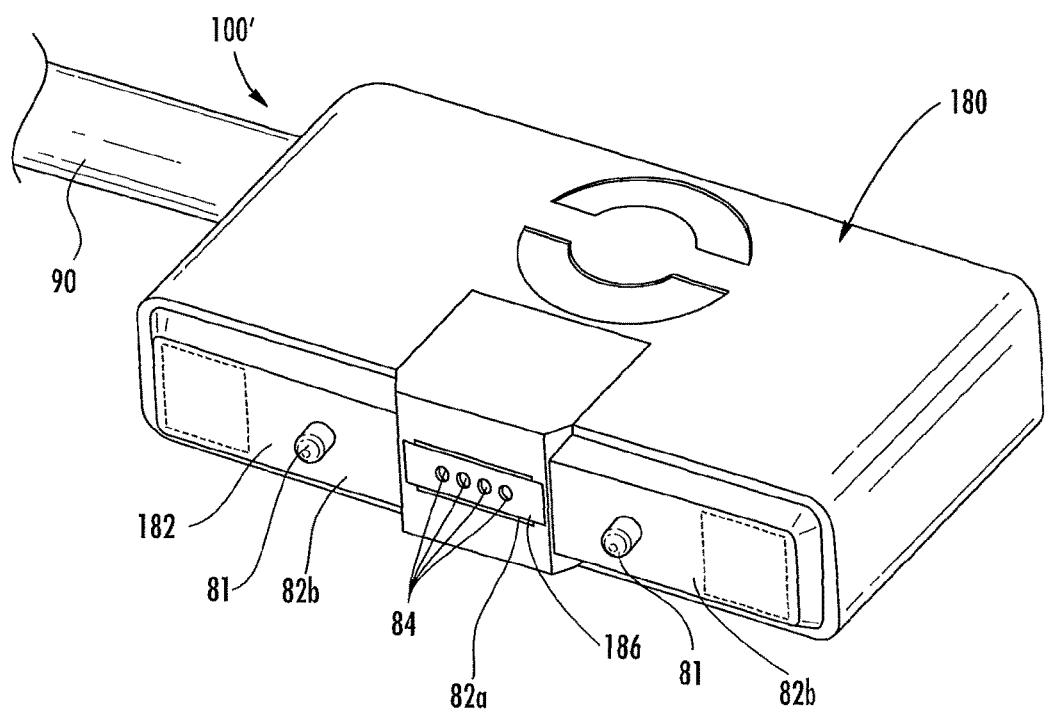

FIGS. 14 and 15 are perspective views of another complimentary explanatory optical plug 180 shown as a portion of a cable assembly 100' suitable for mating with the optical connector 110. Optical plug 180 is similar to optical plug 80, but includes an optical body 182 for supporting one or more electrical contacts 81 such as pogo pins. Further, plug insert 186 is inserted into the plug insert cavity of plug body 182, but extends to the front side of plug body 182. Plug insert 186 forms a portion of the optical section 82a and includes/secures both the lenses 84 and optical fibers 92 of the cable 90 or just the optical fibers 92 that extend to the mating surface.

Figure 16:
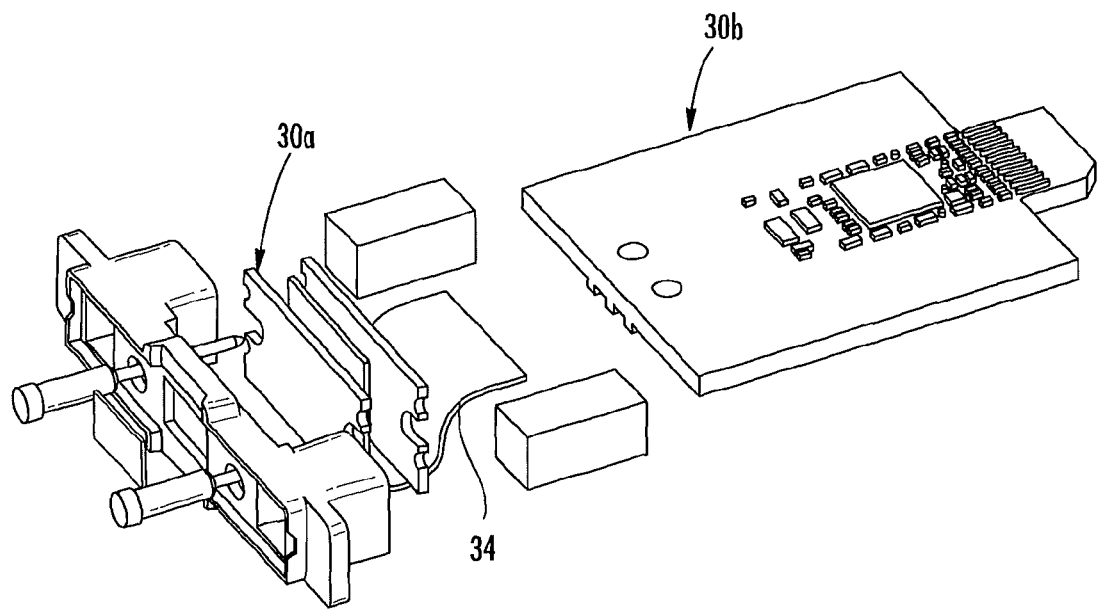
FIG. 16 is a partially exploded view of the optical connector of FIGS. 12 and 13.
Figure 17:
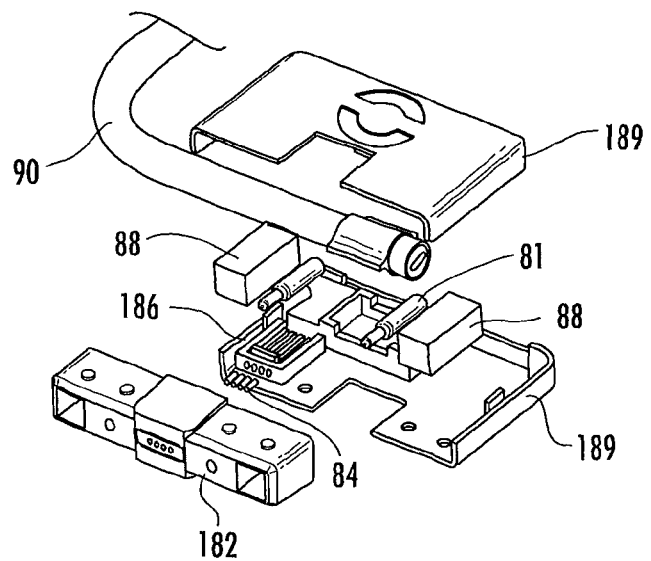
FIG. 17 is a partially exploded view of the optical plug of FIGS. 14 and 15.
Figure 18:
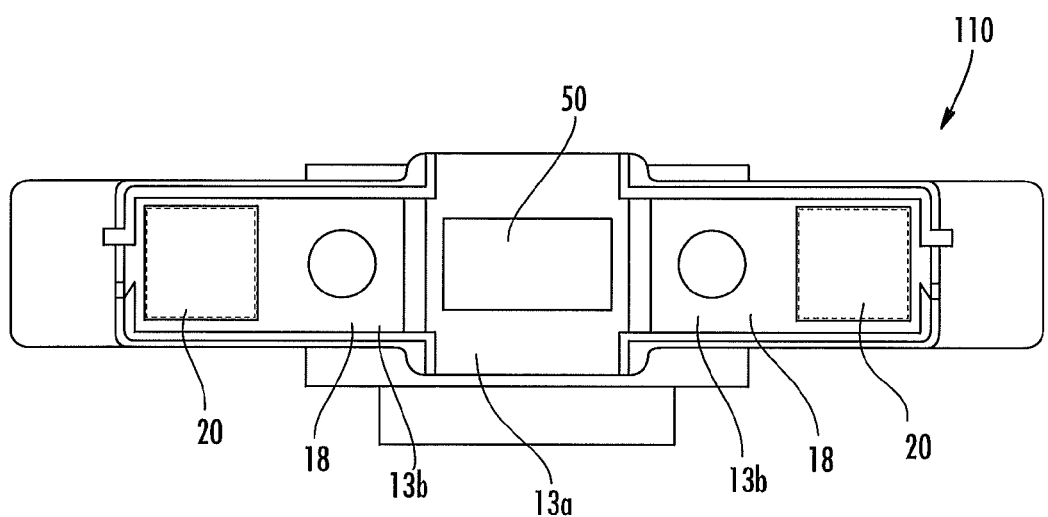
FIGS. 18-20 are further views of the optical connector of FIGS. 12 and 13.
Figure 19:
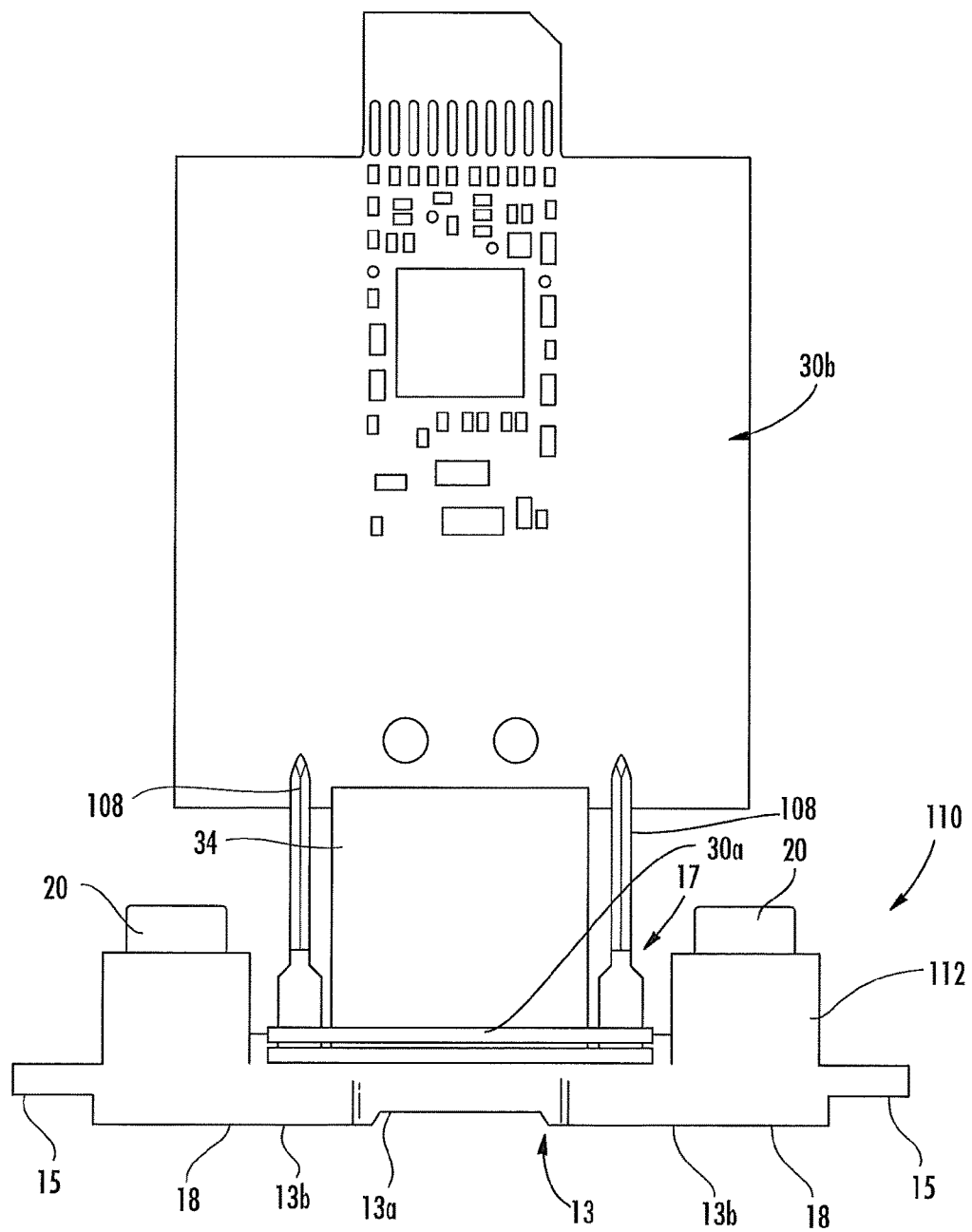
Figure 20:
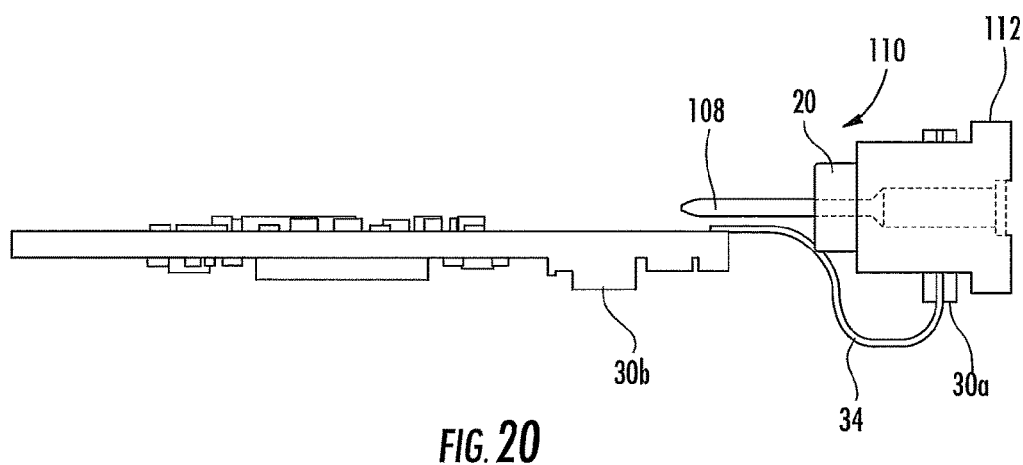

FIG. 16 is a partially exploded view of the optical connector 110 and FIG. 17 is a partially exploded view of the optical plug 180. FIGS. 18-20 are further views of the optical connector 110.

Although the disclosure has been illustrated and described herein with reference to embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. An optical connector, comprising:
an optical body comprising a front side with a first surface, an optical section including at least one optical channel, a datum section disposed on a second surface of the front side and comprising one or more integral alignment features at the second surface, and a circuit mounting portion disposed at a rear side of the optical body, wherein the first surface is recessed from the second surface and the one or more integral alignment features comprise a plurality of protrusions, which are angled outward with a taper; and
at least one magnetic attachment.

2. The optical connector of claim 1, the datum section being arranged on opposite sides of the optical section.

3. The optical connector of claim 1, the one or more integral alignment features being one or more first integral alignment features arranged at a top and a bottom of the datum section at the second surface for alignment in a first direction.

4. The optical connector of claim 1, wherein the first surface being recessed from the second surface provides a second integral alignment feature for alignment in a second direction.

5. The optical connector of claim 1, the optical section having a plurality of channels arranged in multiple rows.

6. The optical connector of claim 5, the plurality of channels being arranged in a two-by-two array.

7. The optical connector of claim 1, further comprising a cover for protecting the optical section.

8. The optical connector of claim 1, further being a portion of an electronic device.

9. An optical connector, comprising:
an optical body comprising a front side with a first surface, an optical section that comprises at least one optical channel, a datum section being arranged on opposite sides of the optical section and disposed on a second surface of the front side and comprising one or more first integral alignment features at the second surface, wherein the first surface is recessed from the second surface, and a circuit mounting portion disposed at a rear side of the optical body, wherein the one or more first integral alignment features are arranged at a top and a bottom of the datum section at the second surface for alignment in a first direction and comprise a plurality of protrusions, which are angled outward with a taper; and
at least one magnetic attachment.

10. The optical connector of claim 9, wherein the first surface being recessed from the second surface provides a second integral alignment feature for alignment in a second direction.

11. The optical connector of claim 9, the optical section having a plurality of channels arranged in multiple rows.

12. The optical connector of claim 11, the plurality of channels being arranged in a two-by-two array.

13. The optical connector of claim 9, further comprising a cover for protecting the optical section.

14. The optical connector of claim 9, further being a portion of an electronic device.

15. A method for making an optical connector, comprising:
providing an optical body comprising a front side with an optical section at a first surface comprising at least one optical channel, a datum section disposed on a second surface of the front side and having one or more integral alignment features at the second surface, wherein the first surface is recessed from the second surface, and a circuit mounting portion disposed at a rear side, wherein the one or more integral alignment features comprise a plurality of protrusions, which are angled outward with a taper; and
attaching a circuit to the circuit mounting portion so that an active component is aligned with the at least one optical channel.

16. The method of claim 15, further comprising the attaching the optical connector to an electronic device.

17. The optical connector of claim 1, the datum section being arranged on opposite sides of the optical section and mounting flanges disposed outboard of the datum section.

18. The optical connector of claim 9, the datum section being arranged on opposite sides of the optical section and mounting flanges disposed outboard of the datum section.

19. The optical connector of claim 1, further comprising a circuit having at least one active component aligned with the at least one optical channel and operably attached to the circuit mounting portion.

20. The optical connector of claim 19, the circuit further comprising a laser driver and a transimpedance amplifier disposed on a first circuit portion.

21. The optical connector of claim 20, the circuit further comprising a flexible substrate for electrically connecting the first circuit portion with a second circuit portion.

22. The optical connector of claim 9, further comprising a circuit having at least one active component aligned with the at least one optical channel and operably attached to the circuit mounting portion.

23. The optical connector of claim 22, the circuit further comprising a laser driver and a transimpedance amplifier disposed on a first circuit portion.

24. The optical connector of claim 23, the circuit comprising a flexible substrate for electrically connecting the first circuit portion with a second circuit portion.

* * * * *